(12) United States Patent
Huang et al.

(10) Patent No.: US 8,508,709 B2
(45) Date of Patent: Aug. 13, 2013

(54) METHOD OF REPAIRING PIXEL STRUCTURE, REPAIRED PIXEL STRUCTURE AND PIXEL ARRAY

(75) Inventors: Yi-Jen Huang, Kaohsiung (TW); Yen-Heng Huang, Taipei County (TW); Wen-Hsien Tseng, Taichung (TW); Chung-Kai Chen, Taichung County (TW); Chia-Hui Pai, Taichung (TW); Wei-Yuan Cheng, Taichung (TW)

(73) Assignee: Au Optronics Corporation, Hsinchu (TW)

( * ) Notice: Subject to any disclaimer, the term of this patent is extended or adjusted under 35 U.S.C. 154(b) by 364 days.

(21) Appl. No.: 12/949,793

(22) Filed: Nov. 19, 2010

(65) Prior Publication Data
US 2012/0038601 A1 Feb. 16, 2012

(30) Foreign Application Priority Data
Aug. 11, 2010 (TW) .............................. 99126768 A

(51) Int. Cl.
*G02F 1/1333* (2006.01)
(52) U.S. Cl.
USPC ........................................................ 349/192
(58) Field of Classification Search
None
See application file for complete search history.

(56) References Cited

U.S. PATENT DOCUMENTS

| 7,012,658 B2 * | 3/2006 | Sawasaki et al. ............... 349/43 |
| 7,253,851 B2 | 8/2007 | Lee et al. |
| 2001/0004273 A1 * | 6/2001 | Sugimoto et al. ............... 349/43 |
| 2002/0063844 A1 | 5/2002 | Matsuura et al. |
| 2008/0002076 A1 * | 1/2008 | Yagi et al. ........................ 349/39 |
| 2011/0037689 A1 * | 2/2011 | Tsubata ........................ 345/103 |
| 2011/0149172 A1 * | 6/2011 | Tsubata ........................ 348/731 |

FOREIGN PATENT DOCUMENTS

| TW | 200804944 | 1/2008 |
| TW | 200925751 | 6/2009 |
| WO | WO 2010/024059 A1 * | 3/2010 |

OTHER PUBLICATIONS

"First Office Action of China Counterpart Application", issued on Apr. 20, 2012, p. 1-p. 7, in which the listed reference was cited.
"Office Action of Taiwan Counterpart Application", issued on Jan. 31, 2013, p. 1-p. 7, in which the listed references were cited.

* cited by examiner

*Primary Examiner* — Michael Stahl
(74) *Attorney, Agent, or Firm* — Jianq Chyun IP Office

(57) ABSTRACT

A method of repairing a pixel structure is provided. In the method, the pixel structure on a substrate is provided and includes a scan line, a data line, an active device, an insulating layer, and a pixel electrode. The scan line and the data line are located on the substrate. The active device is located on the substrate and electrically connected to the scan line and the data line. The insulating layer covers the scan line, the data line, and the active device and has a contact opening. The pixel electrode is located on the insulating layer and fills the contact opening to electrically connect the active device. A laser removing process is performed to remove the pixel electrode in the contact opening, such that the pixel electrode is electrically insulated from the active device.

11 Claims, 5 Drawing Sheets

METHOD OF REPAIRING PIXEL STRUCTURE, REPAIRED PIXEL STRUCTURE AND PIXEL ARRAY

CROSS-REFERENCE TO RELATED APPLICATION

This application claims the priority benefit of Taiwan application serial no. 99126768, filed on Aug. 11, 2010. The entirety of the above-mentioned patent application is hereby incorporated by reference herein and made a part of this specification.

BACKGROUND OF THE INVENTION

1. Field of the Invention

The invention relates to a method of repairing a pixel structure, a repaired pixel structure, and a pixel array. More particularly, the invention relates to a method of repairing a pixel structure of a liquid crystal display (LCD), a repaired pixel structure, and a pixel array.

2. Description of Related Art

LCD is mainly comprised of a thin film transistor (TFT) array substrate, a color filter array substrate, and a liquid crystal layer. The TFT array substrate has a plurality of pixel structures arranged in array, and each of the pixel structures is composed of a TFT, a pixel electrode, and a storage capacitor. When the pixel structure has abnormal electrical properties caused by particles or broken dielectric layers, the pixel structure becomes a dot defect. As long as the dot defect can be repaired and transformed into a dark spot, it is not necessary to discard the defective LCD.

Conventionally, the pixel structures of an LCD are repaired by laser welding and laser cutting. Nonetheless, transformation of the defective pixel structure into the dark spot by conventional laser welding and laser cutting necessitates plenty of cutting and welding operations, which is rather complicated and not cost-effective.

SUMMARY OF THE INVENTION

The invention is directed to a method of repairing a pixel structure. By applying the method, defective pixels can be simply transformed into dark spots.

The invention is further directed to a repaired pixel structure and a pixel array formed by applying the aforesaid repairing method.

The invention provides a method of repairing a pixel structure. In the method, the pixel structure on a substrate is provided, and the pixel structure includes a scan line, a data line, an active device, an insulating layer, and a pixel electrode. The scan line and the data line are located on the substrate. The active device is located on the substrate and electrically connected to the scan line and the data line. The insulating layer covers the scan line, the data line, and the active device. Besides, the insulating layer has a contact opening therein. The pixel electrode is located on the insulating layer and fills the contact opening to electrically connect the active device. A laser removing process is performed to remove at least one portion of the pixel electrode in the contact opening, such that the pixel electrode is electrically insulated from the active device.

The invention further provides a repaired pixel structure that includes a scan line, a data line, an active device, an insulating layer, and a pixel electrode. The scan line and the data line are located on the substrate. The active device is located on the substrate and electrically connected to the scan line and the data line. The insulating layer covers the scan line, the data line, and the active device. Besides, the insulating layer has a contact opening therein. The pixel electrode is located on the insulating layer. Here, the pixel electrode does not cover a bottom of the contact opening, such that the pixel electrode is electrically insulated from the active device.

The invention further provides a pixel array that includes a plurality of first pixel structures and at least one second pixel structure. Each of the first pixel structures includes a first scan line, a first data line, a first active device, an insulating layer, and a first pixel electrode. The second pixel structure includes a second scan line, a second data line, a second active device, the insulating layer, and a second pixel electrode. The first scan line and the first data line are located on a substrate. The first active device is located on the substrate and electrically connected to the first scan line and the first data line. The insulating layer covers the first scan line, the first data line, and the first active device, and the insulating layer has a first contact opening therein. The first pixel electrode is located on the insulating layer. Here, the first pixel electrode fills the first contact opening, such that the first pixel electrode is electrically connected to the first active device. The second scan line and the second data line are located on the substrate. The second active device is located on the substrate and electrically connected to the second scan line and the second data line. The insulating layer covers the second scan line, the second data line, and the second active device, and the insulating layer has a second contact opening therein. The second pixel electrode is located on the insulating layer. Here, the second pixel electrode does not cover a bottom of the second contact opening, such that the second pixel electrode is electrically insulated from the second active device.

Based on the above, the pixel electrode located in the contact opening is removed by performing the laser removing process, such that the pixel electrode is electrically insulated from the active device, and that the pixel structure is transformed into a dark spot. According to the invention, the defective pixel structure can be transformed into the dark spot merely by performing the laser removing process to remove the pixel electrode located in the contact opening. Hence, the method of repairing the pixel structure in this invention is simpler and more convenient than the conventional repairing method.

It is to be understood that both the foregoing general descriptions and the following detailed embodiments are exemplary and are, together with the accompanying drawings, intended to provide further explanation of technical features and advantages of the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The invention provides a method of repairing a pixel structure having defects. By applying the method, the defective pixel can be transformed into a dark spot. Said defects refer to dust, particles, broken dielectric layers, or other defects that lead to abnormal operation of the pixel structure. In view of the above, the following method aims to repair the defective pixel structure.

Figure 1A:
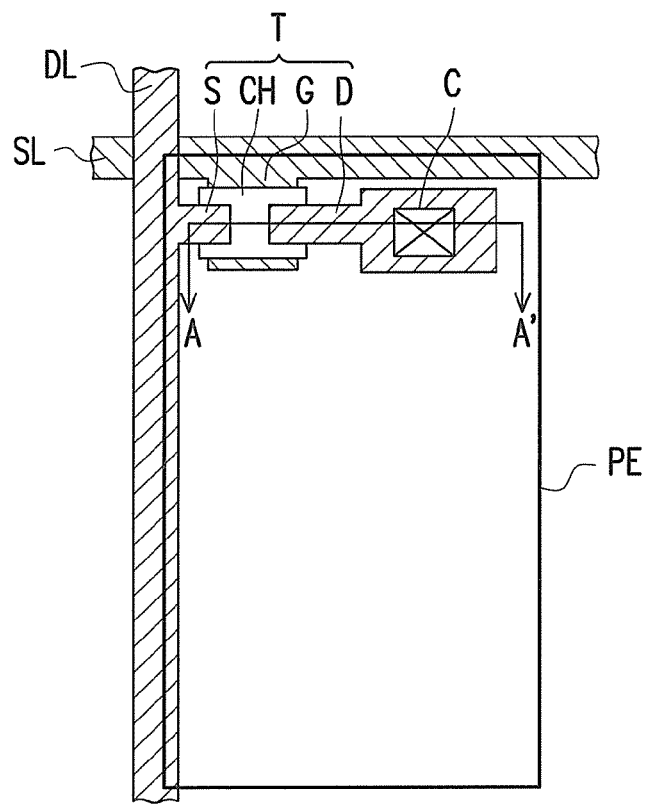
FIG. 1A to FIG. 1B are schematic views illustrating a method of repairing a pixel structure according to an embodiment of the invention.
Figure 1B:
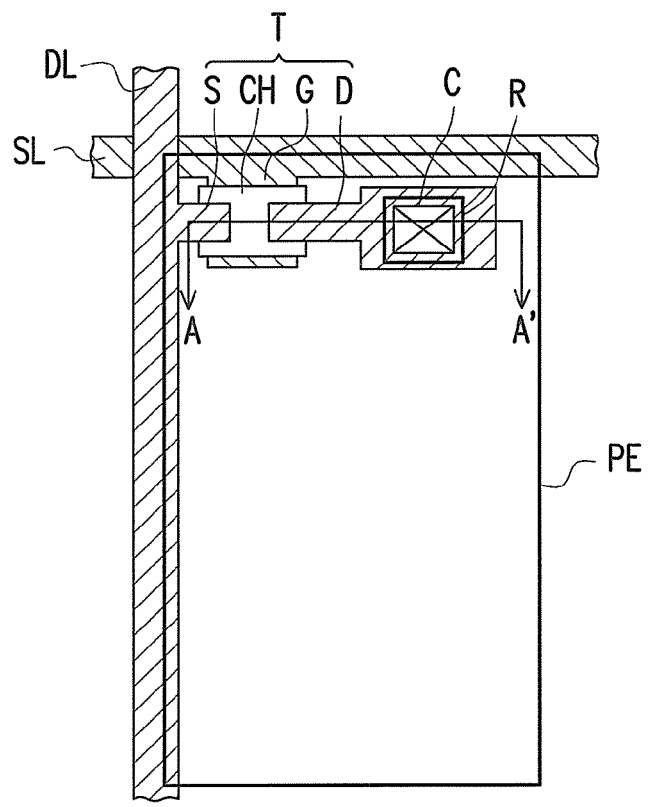
Figure 2A:
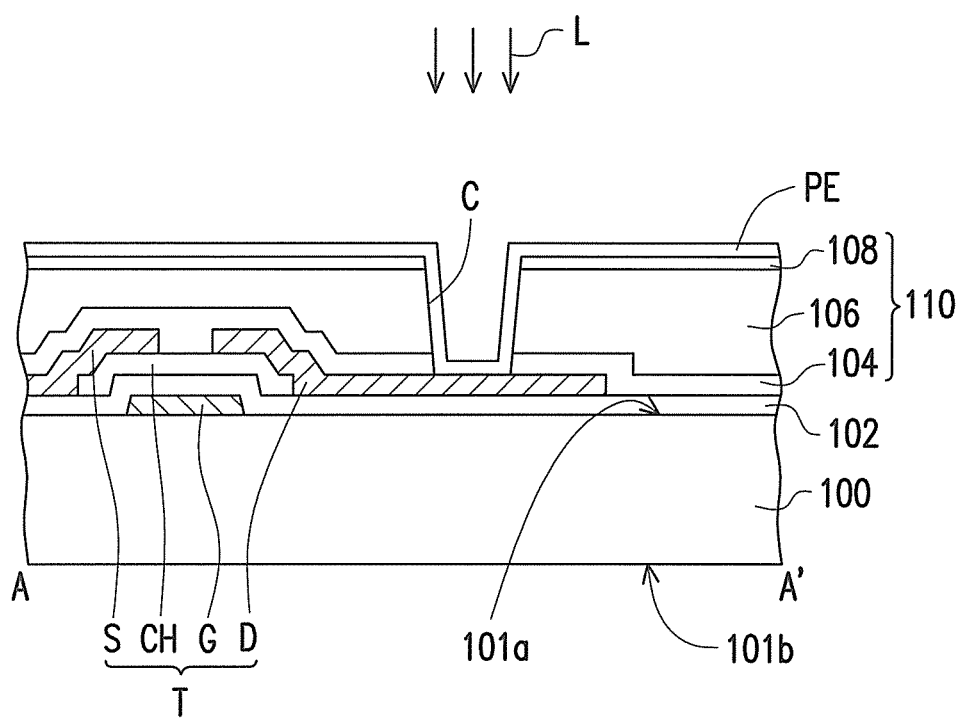
FIG. 2A is a schematic cross-sectional view taken along a sectional line A-A' depicted in FIG. 1A.
Figure 2B:
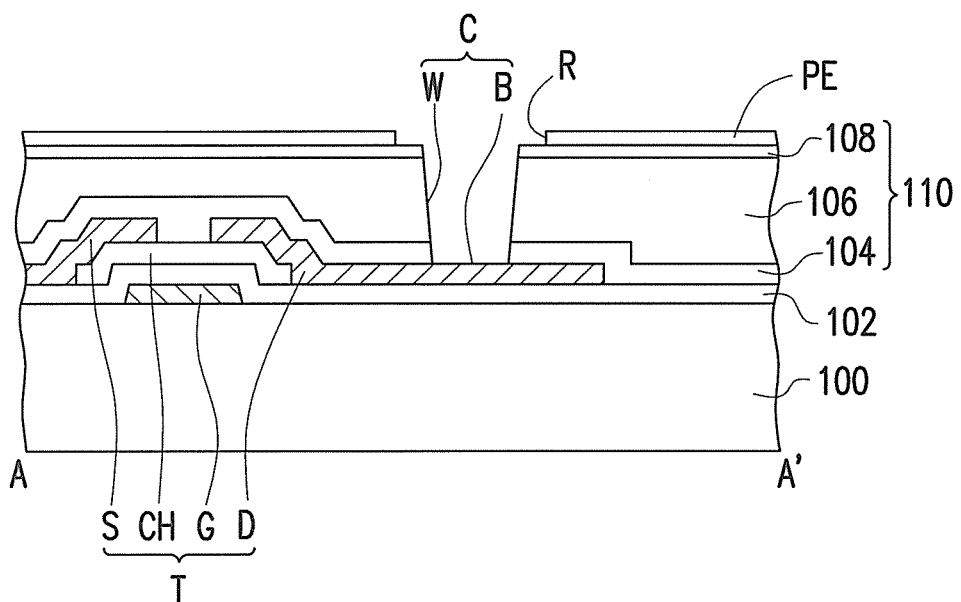
FIG. 2B is a schematic cross-sectional view taken along a sectional line A-A' depicted in FIG. 1B.

FIG. 1A to FIG. 1B are schematic views illustrating a method of repairing a pixel structure according to an embodiment of the invention. FIG. 2A is a schematic cross-sectional view taken along a sectional line A-A' depicted in FIG. 1A. FIG. 2B is a schematic cross-sectional view taken along a sectional line A-A' depicted in FIG. 1B. With reference to FIG. 1A and FIG. 2A, a pixel structure depicted in FIG. 1A is provided. Here, the pixel structure is defective. The defective pixel structure includes a scan line SL and a data line DL that are disposed on a substrate 100, an active device T, an insulating layer 106, and a pixel electrode PE.

The substrate 100 can be made of glass, quartz, organic polymer, a non-light-transmissive/reflective material (such as a conductive material, wafer, ceramics, or the like), or other suitable materials.

The scan line SL and the data line DL are located on the substrate 100. The scan line SL and the data line DL are across arranged. In other words, an extending direction of the data line DL is not parallel to an extending direction of the scan line SL. Preferably, the extending direction of the data line DL is substantially perpendicular to the extending direction of the scan line SL. In addition, the scan line SL and the data line DL are in different layers according to this embodiment. In consideration of electrical conductivity, the scan line SL and the data line DL are normally made of metal materials. However, the invention is not limited thereto. According to other embodiments of the invention, the scan line SL and the data line DL can also be made of other conductive materials, such as an alloy, a metal nitride material, a metal oxide material, a metal oxynitride material, or a layer in which a metal material and other conductive materials are stacked together.

The active device T is located on the substrate 100 and electrically connected to the scan line SL and the data line DL. In this embodiment, the active device T includes a gate G, a channel CH, a source S, and a drain D. The gate G is electrically connected to the scan line SL. The channel CH is located above the gate G. The source S and the drain D are located above the channel CH, and the source S is electrically connected to the data line DL. In this embodiment, an insulating layer 102 is disposed between the gate G and the channel CH. Here, the insulating layer 102 can be referred to as a gate insulating layer. A material of the insulating layer 102 is, for example, silicon oxide, silicon nitride, silicon oxynitride, or a layer in which at least two of said materials are stacked. The aforesaid active device T is a bottom gate TFT, for example; however, the invention is not limited thereto. In other embodiments of the invention, the active device T can also be a top gate TFT.

The insulating layer 110 covers the scan line SL, the data line DL, and the active device T. Besides, the insulating layer 110 has a contact opening C therein. The contact opening C exposes the drain D of the active device T. The insulating layer 110 of this embodiment includes insulating layers 104, 106, and 108. The insulating layer 104 can be referred to as a passivation layer which is exemplarily made of silicon oxide, silicon nitride, silicon oxynitride, or a layer in which at least two of said materials are stacked together. The insulating layer 106 can be a planarization layer or a color filter layer. When the insulating layer 106 is the planarization layer, the insulating layer 106 can be made of an inorganic insulating material, an organic insulating material, or a combination thereof. When the insulating layer 106 is the color filter layer, the insulating layer 106 can be made of a red filter material, a green filter material, or a blue filter material. The insulating layer 108 also serves as a passivation layer and is made of silicon oxide, silicon nitride, silicon oxynitride, or a layer in which at least two of said materials are stacked together, for instance.

The insulating layer 110 of this embodiment is comprised of the passivation layer 104, the planarization layer/the color filter layer 106, and the passivation layer 108; however, note that the number of the insulating layer 110 covering the active device T is not limited in the invention. That is to say, in other embodiments of the invention, the insulating layer 110 can simply be the passivation layer 104. In another embodiment of the invention, the insulating layer 110 covering the active device T can be the passivation layer 104 and the planarization layer 106. In still another embodiment of the invention, the insulating layer 110 covering the active device T can be the color filter layer 106 and the passivation layer 108.

The pixel electrode PE is located on the insulating layer 110. Besides, the pixel electrode PE fills the contact opening C, such that the pixel electrode PE is electrically connected to the drain D of the active device T. The pixel electrode PE can be a transparent pixel electrode, a reflective pixel electrode, or a combination of the transparent pixel electrode and the reflective pixel electrode. A material of the transparent pixel electrode includes metal oxide, such as indium tin oxide (ITO), indium zinc oxide (IZO), aluminum tin oxide (ATO), aluminum zinc oxide (AZO), indium germanium zinc oxide (IGZO), or a stacked layer having at least two of the above materials. A material of the reflective pixel electrode includes a metal material featuring great reflectivity.

As shown in FIG. 2A, a laser removing process L is performed to remove the pixel electrode PE located in the contact opening C, such that the pixel electrode PE is electrically insulated from the active device T, as indicated in FIG. 1B and FIG. 2B. According to this embodiment, an opening R is formed in the pixel electrode PE after the laser removing process L is performed, and the opening R exposes the contact opening C.

In the laser removing process L of this embodiment, the laser has the wavelength of about 266 nm~about 1064 nm. In addition, the laser removing process L is performed on the front end of the substrate 100 according to this embodiment. To be more specific, the substrate 100 has a front surface 101a and a back surface 101b, and the pixel structure shown in FIG. 1A is located on the front surface 101a of the substrate 100. The laser employed in the laser removing process L is emitted toward the pixel structure from an area above the front surface 101a of the substrate 100. Since laser energy of the laser removing process L is accurately controlled, the pixel electrode PE in the contact opening C can be removed without leaving residual particles and doing harm to the insulating layer 110.

The pixel structure repaired by performing the method depicted in FIG. 1A to FIG. 1B is shown in FIG. 1B and FIG. 2B. The repaired pixel structure includes the scan line SL, the data line DL, the active device T, the insulating layer 110, and the pixel electrode PE. The scan line SL and the data line DL are located on the substrate 100. The active device T is located on the substrate 100 and electrically connected to the scan line SL and the data line DL. The insulating layer 110 covers the scan line SL, the data line DL, and the active device T. Besides, the insulating layer 110 has the contact opening C therein. The pixel electrode PE is located on the insulating layer 110 and does not cover a bottom B, a side surface W, and the periphery of the contact opening C, such that the pixel electrode PE is electrically insulated from the active device T. In another embodiment of the invention, the pixel electrode PE does not cover the bottom B and the side surface W of the contact opening C.

As described above, the pixel electrode PE located in the contact opening C is completely removed by performing the laser removing process L, and therefore the pixel electrode PE does not fill the contact opening C after the laser removing process L is performed. Namely, after the laser removing process L is removed, as shown in FIG. 2B, the bottom B and the side surface W of the contact opening C are exposed and are not covered by the pixel electrode PE. However, the invention is not limited thereto. In another embodiment of the invention, it is likely to merely remove the pixel electrode PE located at the bottom B of the contact opening C by performing the laser removing process L, such that the pixel electrode PE is electrically insulated from the active device T, as indicated in FIG. 3.

Figure 3:
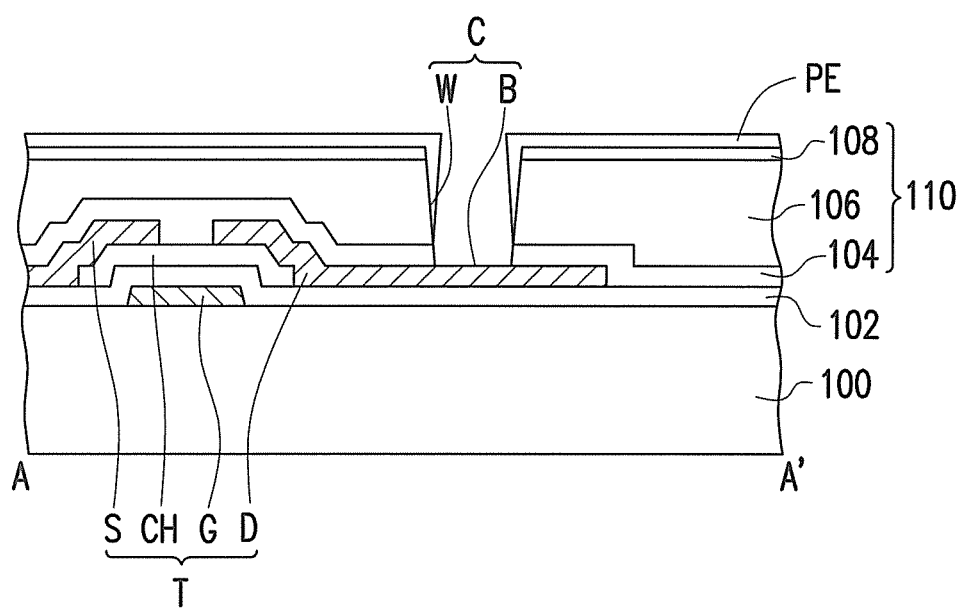
FIG. 3 is a schematic cross-sectional view illustrating a repaired pixel structure according to another embodiment of the invention.

FIG. 3 is a schematic cross-sectional view illustrating a repaired pixel structure according to another embodiment of the invention. The embodiment shown in FIG. 3 is similar to the embodiment shown in FIG. 2B, so that components identical to those in FIG. 2B are represented by the same numerals in FIG. 3 and not repeated herein. The difference between the embodiment depicted in FIG. 3 and the embodiment depicted in FIG. 2B lies in that the pixel electrode PE at the bottom B of the contact opening C is removed by performing the laser removing process L in FIG. 3. Hence, after the laser removing process L is performed, the pixel electrode PE partially covers the side surface W of the contact opening C.

It should be mentioned that the laser removing process of this invention is performed to remove the pixel electrode located above the drain of the active device, such that the active device is electrically insulated from the pixel electrode, and that the defective pixel structure can be transformed into the dark spot. Hence, the pixel structure described in the above embodiments of the invention is merely exemplary but not restrictive.

Figure 4:
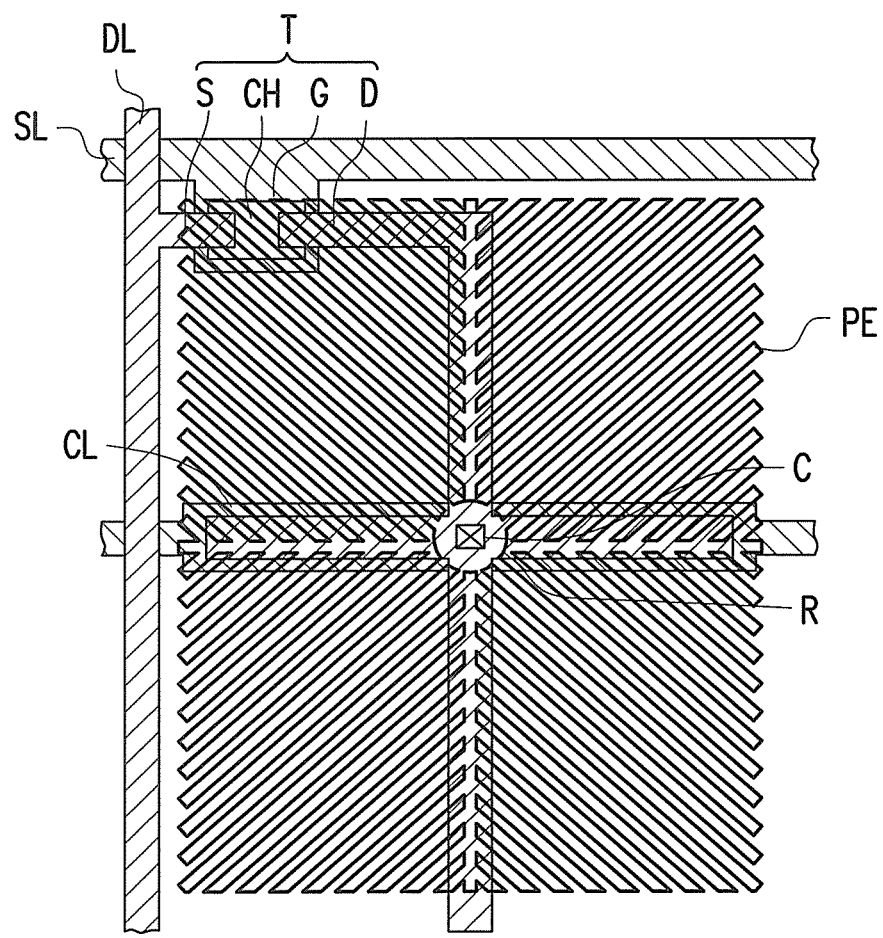
FIG. 4 is a schematic top view illustrating a repaired pixel structure according to another embodiment of the invention.

In other words, arrangement of the pixel structure is not limited in the invention. For instance, according to an embodiment of the invention, the drain of the active device of the pixel structure can be extended to a central portion of the pixel structure, as shown in FIG. 4. In the pixel structure depicted in FIG. 4, the drain D is extended to the central portion of the pixel structure, and therefore the contact opening C is located at the center of the pixel structure. In addition, the pixel structure of this embodiment can further include a common electrode CL. Alignment slits or alignment protrusions are further disposed in the pixel electrode PE. More particularly, in the repaired pixel structure, an opening R in the pixel electrode PE exposes the contact opening C, and therefore the pixel electrode PE is electrically insulated from the drain D.

Figure 5:
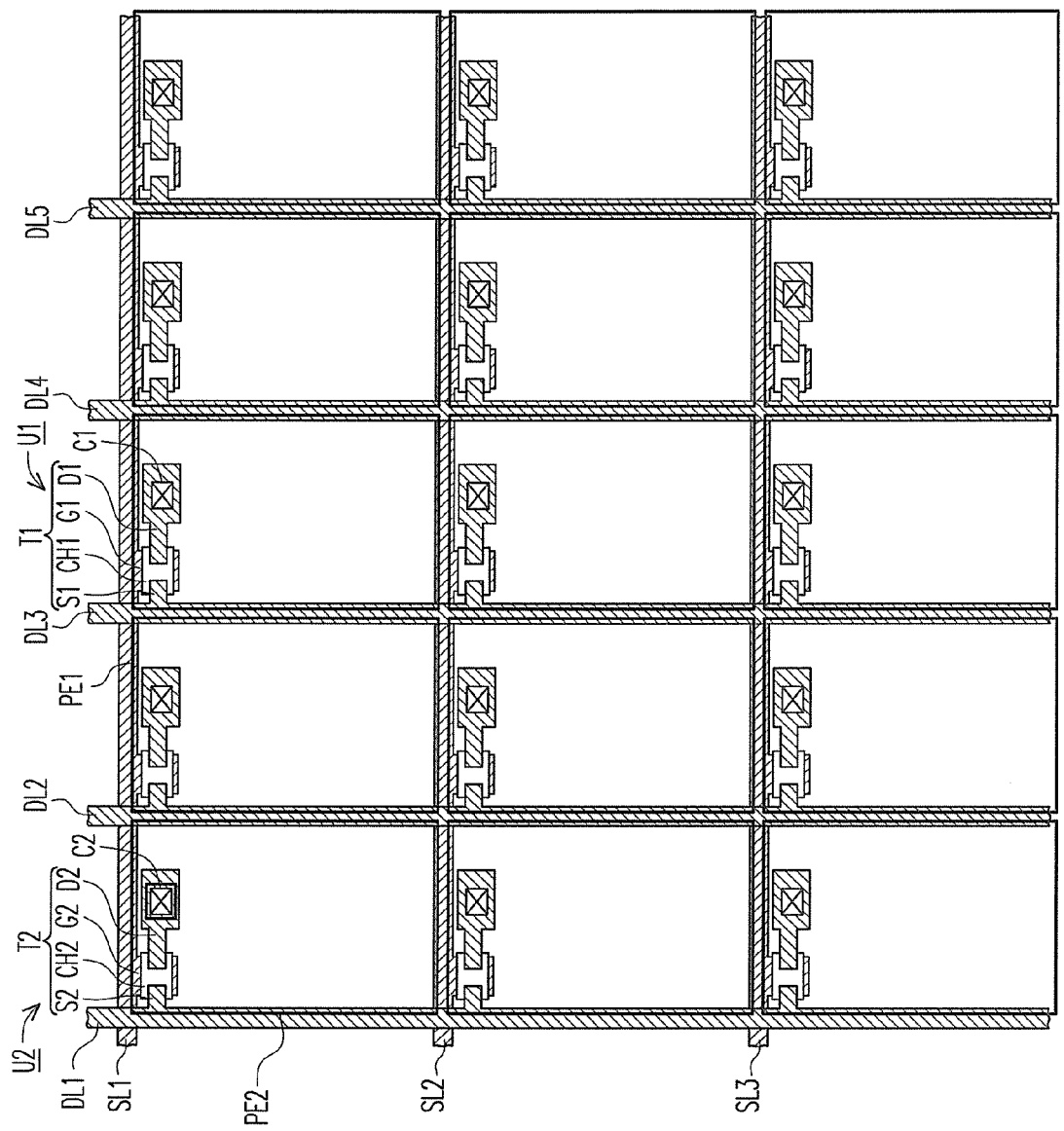
FIG. 5 is a schematic view illustrating a pixel array according to an embodiment of the invention.

FIG. 5 is a schematic view illustrating a pixel array according to an embodiment of the invention. With reference to FIG. 5, the pixel array is formed by a plurality of pixel structures, and the pixel array has a plurality of normal pixel structures U1 and at least one repaired pixel structure U2. Namely, in the pixel array of this embodiment, most of the pixel structures (the pixel structures U1) are normal. A few pixel structures (i.e., at least one pixel structure U2) are repaired pixel structures (i.e., transformed into dark spots), and the repaired pixel structures are shown in FIG. 1B (FIG. 2B), FIG. 3, or FIG. 4. The pixel array of this embodiment is elaborated hereinafter.

With reference to FIG. 5, the pixel array includes scan lines SL1~SL3 and data lines DL1~DL5, active devices T1 and T2, an insulating layer, and pixel electrodes PE1 and PE2. In the pixel structures of the pixel array, the same elements depicted in FIG. 1A to FIG. 1B and in FIG. 2A to FIG. 2B are marked by similar reference numbers and symbols in FIG. 5.

The scan lines SL1~SL3 and the data lines DL1~DL5 are across arranged. In other words, an extending direction of the data lines DL1~DL5 is not parallel to an extending direction of the scan lines SL1~SL3. Preferably, the extending direction of the data lines DL1~DL5 is substantially perpendicular to the extending direction of the scan lines SL1~SL3. In addition, the scan lines SL1~SL3 and the data lines DL1~DL5 are in different layers. Materials of the scan lines SL1~SL3 and the data lines DL1~DL5 are identical or similar to the materials of the scan line and the data line in the embodiment depicted in FIG. 1A and FIG. 1B.

Each of the normal pixel structures U1 includes the active device T1 and the pixel electrode PE1. The active device T1 is electrically connected to one of the scan lines SL1~SL3 and one of the data lines DL1~DL5. The active device T1 includes a gate G1, a channel CH1, a source S1, and a drain D1. In the exemplary pixel structure marked by "U1" as depicted in FIG. 5, the gate G1 is electrically connected to the scan line SL1. The channel CH1 is located above the gate G1. The source S1 and the drain D1 are located above the channel CH1, and the source S1 is electrically connected to the data line DL3. The pixel electrode PE1 is electrically connected to the active device T1.

The repaired pixel structure U2 that is transformed into the dark spot includes the active device T2 and the pixel electrode PE2. The active device T2 is electrically connected to one of the scan lines SL1~SL3 and one of the data lines DL1~DL5. The active device T2 includes a gate G2, a channel CH2, a source S2, and a drain D2. In the exemplary pixel structure U2 depicted in FIG. 5, the gate G2 is electrically connected to the scan line SL1. The channel CH2 is located above the gate G2. The source S2 and the drain D2 are located above the channel CH2, and the source S2 is electrically connected to the data line DL1. The pixel electrode PE2 is electrically insulated from the active device T2.

Similarly, in this embodiment, an insulating layer is disposed between the gates G1 and G2 of the active devices T1 and T2 and the channels CH1 and CH2 (e.g., the insulating layer 102 depicted in FIG. 2A and FIG. 2B), and the insulating layer herein can be referred to as the gate insulating layer. The aforesaid active devices T1 and T2 are bottom gate TFTs, for example; however, the invention is not limited thereto. According to other embodiments of the invention, the active devices T1 and T2 can also be top gate TFTs.

An insulating layer (e.g., the insulating layer 110 depicted in FIG. 2A and FIG. 2B) is further disposed between the pixel electrode PE1 and the active device T1 and between the pixel electrode PE2 and the active device T2. Specifically, the contact opening C1 is in the insulating layer of the normal pixel structure U1, and the contact opening C1 exposes the drain D1 of the active device T1. Here, the pixel electrode PE1 fills the contact opening C1 to electrically connect the drain D1 of the active device T1. The contact opening C2 is in the insulating layer of the repaired pixel structure U2, and the contact opening C2 exposes the drain D2 of the active device T2. Here, the pixel electrode PE2 does not cover the bottom of the contact opening C2, such that the pixel electrode PE2 is electrically insulated from the active device T2.

Similarly, it is likely for the pixel electrode PE2 of the repaired pixel structure U2 not to fill the contact opening C2 at all, such that the pixel electrode PE2 is electrically insulated from the active device T2, as indicated in FIG. 1B and FIG. 2B. Alternatively, the pixel electrode PE2 does not cover the bottom of the contact opening C2 but partially covers the side surface of the contact opening C2, such that the pixel electrode PE2 is electrically insulated from the active device T2, as indicated in FIG. 3.

In light of the foregoing, the pixel electrode located in the contact opening is removed by performing the laser removing process according to the invention, such that the pixel electrode is electrically insulated from the active device, and that the defective pixel structure is transformed into a dark spot. According to the invention, the defective pixel structure can be transformed into the dark spot merely by performing the laser removing process to remove the pixel electrode located in the contact opening. Hence, the method of repairing the pixel structure in this invention is simpler and more convenient than the conventional repairing method.

Moreover, the laser energy used in the repairing method can be accurately controlled according to the invention, such that the pixel electrode in the contact opening can be removed without leaving residual particles and doing harm to the insulating layer that underlies the pixel electrode.

It will be apparent to those skilled in the art that various modifications and variations can be made to the structure of the invention without departing from the scope or spirit of the invention. In view of the foregoing, it is intended that the present invention cover modifications and variations of the invention provided they fall within the scope of the following claims and their equivalents.

What is claimed is:

1. A method of repairing a pixel structure, comprising:
   providing the pixel structure located on a substrate, the pixel structure comprising:
      a scan line and a data line, located on the substrate;
      an active device, located on the substrate and electrically connected to the scan line and the data line;
      an insulating layer, covering the scan line, the data line, and the active device, the insulating layer having a contact opening therein;
      a pixel electrode, located on the insulating layer, wherein the pixel electrode fills the contact opening, such that the pixel electrode is electrically connected to the active device; and
   performing a laser removing process to remove at least one portion of the pixel electrode in the contact opening, such that the pixel electrode partially covers a side surface of the contact opening and is electrically insulated from the active device.

2. The method as claimed in claim 1, wherein laser light of the laser removing process has a wavelength of about 266 nm~about 1064 nm.

3. The method as claimed in claim 1, wherein the substrate has a front surface and a back surface, the pixel structure is located on the front surface of the substrate, and the laser light of the laser removing process is emitted toward the pixel structure from an area above the front surface of the substrate.

4. The method as claimed in claim 1, wherein the insulating layer comprises:
   a color filter layer; and
   a passivation layer covering the color filter layer.

5. The method as claimed in claim 1, wherein the active device has a gate, a source, and a drain, and the contact opening is located above the drain and exposes the drain.

6. A repaired pixel structure comprising:
   a scan line and a data line, located on a substrate;
   an active device, located on the substrate and electrically connected to the scan line and the data line;
   an insulating layer, covering the scan line, the data line, and the active device, the insulating layer having a contact opening therein; and
   a pixel electrode located on the insulating layer, wherein the pixel electrode does not cover a bottom of the contact opening and the pixel electrode partially covers a side surface of the contact opening, such that the pixel electrode is electrically insulated from the active device.

7. The repaired pixel structure as claimed in claim 6, wherein the insulating layer comprises:
   a color filter layer; and
   a passivation layer covering the color filter layer.

8. The repaired pixel structure as claimed in claim 6, wherein the active device has a gate, a source, and a drain, and the contact opening is located above the drain and exposes the drain.

9. A pixel array comprising:
   a plurality of first pixel structures, each of the first pixel structures comprising:
      a first scan line and a first data line, located on a substrate;
      a first active device, located on the substrate and electrically connected to the first scan line and the first data line;
      an insulating layer, covering the first scan line, the first data line, and the first active device, the insulating layer having a first contact opening therein;
      a first pixel electrode, located on the insulating layer, wherein the first pixel electrode fills the first contact opening, such that the first pixel electrode is electrically connected to the first active device; and
   at least one second pixel structure comprising:
      a second scan line and a second data line, located on the substrate;
      a second active device, located on the substrate and electrically connected to the second scan line and the second data line;
      the insulating layer covering the second scan line, the second data line, and the second active device, the insulating layer having a second contact opening therein; and
      a second pixel electrode located on the insulating layer, wherein the second pixel electrode does not cover a bottom of the second contact opening and the second pixel electrode partially covers a side surface of the second contact opening, such that the second pixel electrode is electrically insulated from the second active device.

10. The pixel array as claimed in claim 9, wherein the insulating layer comprises:
    a color filter layer; and
    a passivation layer covering the color filter layer.

11. The pixel array as claimed in claim 9, wherein the first active device has a first gate, a first source, and a first drain, the second active device has a second gate, a second source, and a second drain, the first contact opening is located above the first drain and exposes the first drain, and the second contact opening is located above the second drain and exposes the second drain.

* * * * *